(No Model.)
H. VOGELER.
BICYCLE TRAINER.
No. 604,200. Patented May 17, 1898.
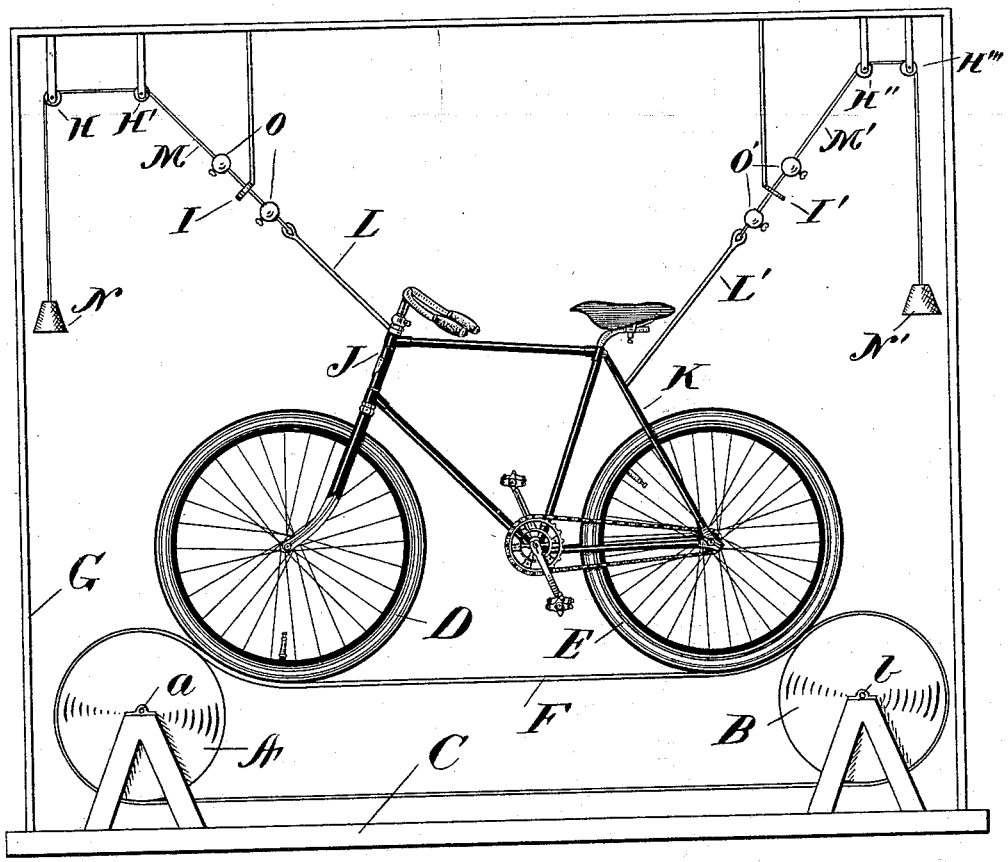
Witnesses.
Eliz. Kincaid.
R. Henson.
Inventor.
Henry Vogeler.
by Kincaid & Co.
his atty's.
THE NORRIS PETERS CO., PHOTO-LITHO., WASHINGTON, D. C.

UNITED STATES PATENT OFFICE.

HENRY VOGELER, OF SAN FRANCISCO, CALIFORNIA.

BICYCLE-TRAINER.

SPECIFICATION forming part of Letters Patent No. 604,200, dated May 17, 1898.

Application filed May 12, 1896. Serial No. 591,280½. (No model.)

*To all whom it may concern:*

Be it known that I, HENRY VOGELER, a citizen of the United States, residing in the city and county of San Francisco and State of California, have invented certain new and useful Improvements in Bicycle Training-Machines; and I do hereby declare the following to be a full, clear, and exact description of the invention, such as will enable others skilled in the art to which it appertains to make and use the same.

This invention relates to that class of devices known in the art as "bicycle training-machines," which are provided to aid the novice in speedily attaining that degree of confidence in his ability to preserve his equilibrium while mounted on a bicycle necessary to enable him to ride unaided and with comparative safety.

The prime objects of my present invention are to provide a simple, compact, durable, and efficient device by means of which the bicycle is permitted to leave a perpendicular position only within certain limits, and, further, the entire weight of the machine and rider is so supported that the retarding action due to traction is properly directed without the necessity of the machine moving forward.

Other objects and advantages of the invention consequent from the carrying out of the above prime objects will be hereinafter specified, and the novel features thereof specifically defined by the appended claim.

In the accompanying drawing I have clearly illustrated the invention and have employed letters of reference to designate the several parts.

In the view shown I have represented an ordinary bicycle of the "safety" type with diamond frame in elevation and represented the relative position of the parts of my invention.

A and B represent two similar cylindrical drums journaled to the extremities of the framework C and at a sufficient distance apart to enable the forward and rear wheels D and E, respectively, to rest between perpendicular lines through the journals $a$ and $b$, as shown in the drawing.

Supporting the wheels D and E and passing over the drums A and B is the endless belt F, the tension of which is such as to permit the upper portion thereof to sag sufficiently to cause the bicycle to assume the position shown.

Leading upward from the extremities of the framework C and passing directly over the bicycle is the frame G, from which depend the small guide-pulleys H H' H'' H''' and eyes I I'.

Secured to the crown of the head J and to the rear member K of the bicycle are the rods L L', respectively, which reach upward and forward and backward at about an angle of forty-five degrees. Secured to the upper extremities of these rods L and L' are the ropes M and M', which pass through the eyes I and I' and pulleys H H' H'' H''' and from which depend the weights N N', adjustably secured to the ropes M and M', and on each side of the eyes I I' are the stops O O'.

It is manifest from the above description that as the rider operates the pedals the motion of the rear wheel causes the belt to travel over the drums and impart motion to the front wheel, while the action of the suspended weights upholds the rider. The stops O O' permit the tilting of the machine only within certain limits, which can be regulated by their adjustable nature. It is further evident that were some external power directed to one of the drums and the belt caused to travel the rider could then remove his feet from the pedals and devote his entire attention to guiding and preserving the equilibrium of the machine. The belt is sufficiently wide to permit of any side motion or play of the bicycle. There are various forms which this device may take on and still be within the spirit of my invention, and I do not desire to confine myself to the exact construction and location of parts herein shown and described.

Having thus fully described my invention, what I claim, and desire to secure by Letters Patent, is—

A bicycle training-machine provided with an endless belt F for supporting the wheels of the bicycle, guides L L' reaching upward from said bicycle and yieldingly secured to an overhead support, and stops O O' adapted to limit the play of said guides substantially as set forth.

HENRY VOGELER.

Witnesses:
A. W. FINK,
O. FISCHER.